Dec. 16, 1958     D. J. LA BELLE     2,864,453
WEIGHT-SHIFTING APPARATUS FOR TANDEM AXLE VEHICLES
Filed June 29, 1956

INVENTOR.
Donald J. LaBelle
BY
S. C. Thorpe
ATTORNEY

United States Patent Office 2,864,453
Patented Dec. 16, 1958

2,864,453

WEIGHT-SHIFTING APPARATUS FOR TANDEM AXLE VEHICLES

Donald J. La Belle, Huntington Woods, Mich., assignor to General Motors Corporation, Detroit, Mich., a corporation of Delaware Application June 29, 1956, Serial No. 594,921

2 Claims. (Cl. 180—22)

This invention relates to tandem axle vehicles and more particularly concerns such vehicles in which one of the axles is a driving axle.

Considerable difficulty has been experienced with vehicles of the indicated type on icy or wet streets or roads, especially where there are grades to be negotiated. This difficulty owes to inadequate traction of the driving wheels with the road surface due to insufficient weight over the driving axle relative to the idler axle or axles.

The weight on the axles is, of course, a function of the load and distribution of the load to assure proper traction of the driving wheels where the road surface is slippery is not always feasible and seldom, if ever, convenient.

The present invention aims to provide apparatus whereby the load on the driving axle or axles may be quickly changed as determined by the prevailing conditions through the simple expedient of manipulating a switch or the equivalent, preferably located in a readily accessible place in the operator's compartment of the vehicle.

Another object is to provide apparatus easily controllable to comply with State and Interstate regulations setting different maximum limits on driving axle load.

Still another object is to provide means whereby both conventional and unconventional rear suspension systems may be readily and cheaply modified for installation of the apparatus.

Figure 1:
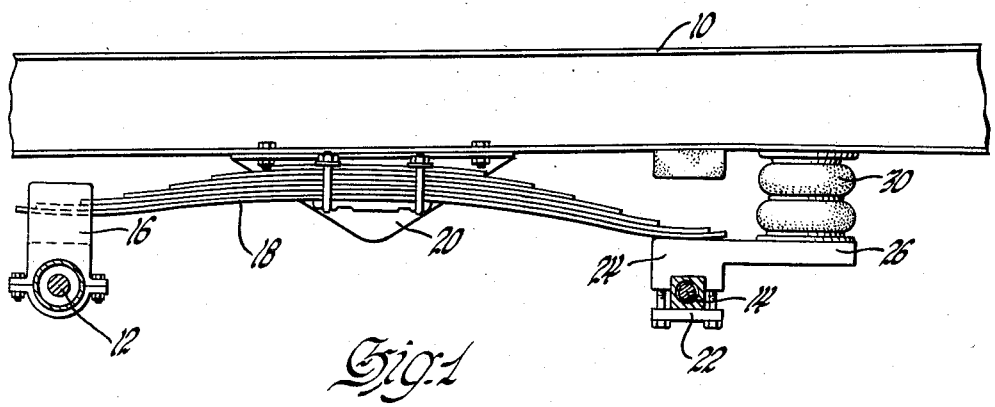
Figure 2:
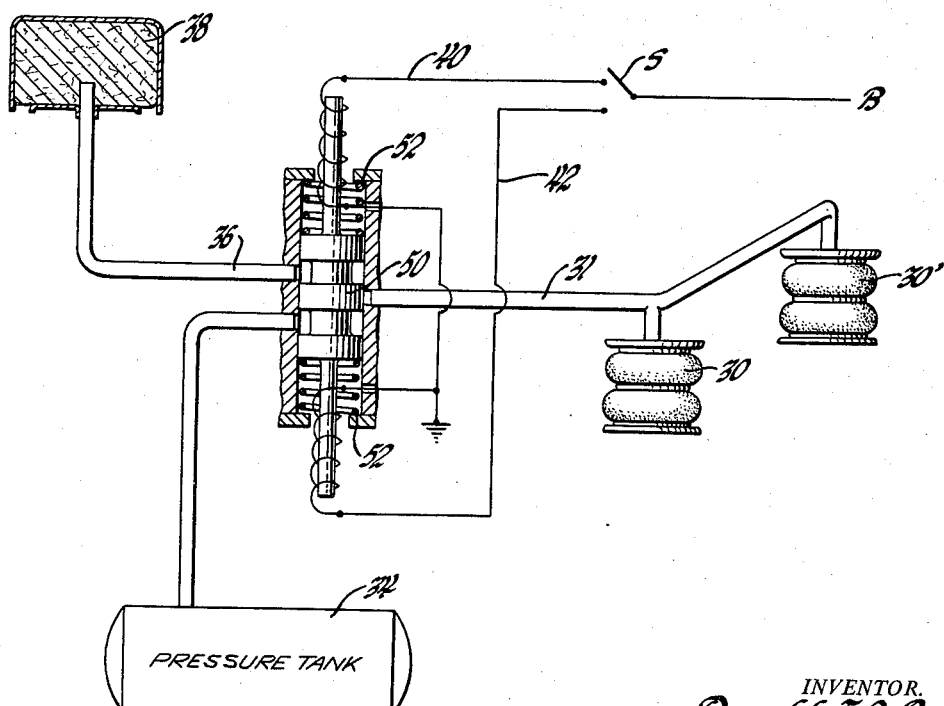

The invention will be specifically described in terms of a preferred embodiment thereof illustrated by the accompanying drawings in which:

Figure 1 is a fragmentary side elevation showing the rear portion of a tandem axle vehicle equipped according to the invention; and Figure 2 is a diagrammatic representation of the apparatus controlling the load on the driving axle.

In Figure 1, the numeral 10 denotes one of the side rail components of the vehicle frame. Below the frame member is an idler axle 12 and a driving axle 14, the latter in the case of the particular vehicle being located rearwardly of the idler axle.

Axle 12 is provided with a saddle 16 accommodating the left end of a leaf spring 18 which extends through a bracket mounting 20 affixed to the frame 10. Driving axle 14 has secured thereto a saddle 22 carrying a fixture 24 functional with relation to the leaf spring. A cantilevered platform portion 26 of the saddle 22 mounts an air cushion 30 which may be of a design similar to the air springs currently in use on certain coaches and trucks. The upper portion of the air cushion is suitably connected to the frame 10.

Figure 2 shows a second air cushion 30', this being the cushion mounted on the saddle carried by the driving axle at the opposite side of the vehicle. The figure further shows a solenoid valve 50 in circuit with a source of voltage B via leads 40 and 42. A single pole, double throw switch S in the electric circuit should be considered as located on the instrument panel of the vehicle, for example.

The pneumatic system includes besides the cushions 30, 30' an air tank 34 which may be maintained at a predetermined pressure by a rotary compressor, not shown, powered by the generator shaft, for instance. Exhaust conduit 36 is provided with an air filter 38 to prevent the entry of dirt and other foreign matter.

In operation, should a condition be encountered making it desirable to increase the load on the driving axle thereby to obtain improved traction, the operator has only to close the switch S to energize the circuit including lead 40 thereby to admit pressure air to the cushions 30, 30'. The idler axle is thus relieved of a part of the load it had been carrying, the weight being transferred to the driving axle 14. The amount of the load so shifted is essentially a function of the extent of pressurization of the cushions.

To release air from the cushions 30, 30' when necessary or desirable, switch S is closed to energize the circuit comprising lead 42.

The operation of valve element 50 is believed obvious from the drawing. Such element when switch S is opened is returned to its neutral position blocking flow through any of the air conduits by centering springs 52.

If desired, a pressure gauge may be located in line 31, for example, and may be provided with electrical connections leading to a calibrated dial visible to the operator of the vehicle and serving to translate air pressure into weight or load change.

As a safeguard, the switch S may be circuited with a warning buzzer or the like to avoid its being inadvertently left closed.

The invention having been thus described and illustrated what is claimed is:

1. In a tandem axle vehicle including a driving axle and an idler axle, a saddle member secured to said driving axle and having in addition to a portion positioned over such axle a cantilevered platform portion extending rearwardly thereof, a leaf spring bridging the space between said axles and operably connected thereto and to the vehicle frame, an air cushion carried by said cantilevered portion of said saddle and connected at its upper end to said frame, an air tank in circuit with said cushion and control means comprising a supply port and an exhaust port whereby air may be charged and withdrawn from said cushion.

2. A vehicle equipped according to claim 1 wherein said control means takes the form of a three-way solenoid valve.

References Cited in the file of this patent

UNITED STATES PATENTS

| | | |
|---|---|---|
| 2,427,927 | Schutte | Sept. 23, 1947 |
| 2,599,043 | Bissell | June 3, 1952 |
| 2,691,420 | Fox | Oct. 12, 1954 |
| 2,710,184 | Pemberton | June 7, 1955 |

FOREIGN PATENTS

| | | |
|---|---|---|
| 432,422 | Great Britain | July 25, 1935 |